United States Patent
Volke et al.

(10) Patent No.: US 12,227,086 B2
(45) Date of Patent: Feb. 18, 2025

(54) ACTIVE DISCHARGE OF AN ELECTRIC DRIVE SYSTEM

(71) Applicant: POWER INTEGRATIONS, INC., San Jose, CA (US)

(72) Inventors: Andreas Volke, Soest (DE); Christoph Dustert, Soest (DE)

(73) Assignee: POWER INTEGRATIONS, INC., San Jose, CA (US)

( * ) Notice: Subject to any disclaimer, the term of this patent is extended or adjusted under 35 U.S.C. 154(b) by 374 days.

(21) Appl. No.: 17/581,777

(22) Filed: Jan. 21, 2022

(65) Prior Publication Data

US 2022/0258610 A1 Aug. 18, 2022

(30) Foreign Application Priority Data

Feb. 18, 2021 (EP) .................................. 21157846

(51) Int. Cl.
*B60L 3/00* (2019.01)
*B60L 3/04* (2006.01)
(Continued)

(52) U.S. Cl.
CPC ............. *B60L 3/003* (2013.01); *B60L 3/0046* (2013.01); *B60L 3/04* (2013.01); *B60L 15/007* (2013.01);
(Continued)

(58) Field of Classification Search
CPC .......... B60L 3/003; B60L 3/0046; B60L 3/04; B60L 15/007; B60L 50/51;
(Continued)

(56) References Cited

U.S. PATENT DOCUMENTS

| 5,172,308 A | 12/1992 | Tohya |
| 7,109,686 B2 * | 9/2006 | Schulte ..................... B60L 7/14 320/167 |

(Continued)

FOREIGN PATENT DOCUMENTS

| CN | 109600030 A | 4/2019 |
| DE | 112011105295 B4 | 2/2017 |

(Continued)

OTHER PUBLICATIONS

European Patent Application No. 22157367.8; "European Search Report Mailed Jun. 10, 2022"; Jun. 10, 2022; 13 pages.

(Continued)

*Primary Examiner* — David Luo
(74) *Attorney, Agent, or Firm* — Karina Martha G. Li (57) ABSTRACT

An electric drive system for a vehicle includes an inverter having at least one phase leg, wherein a first of the phase legs includes a first power switch; an internal voltage supply configured to generate an internal supply voltage regulated with respect to a voltage on a rail and a second voltage, wherein the internal voltage supply is configured to reduce a voltage difference between the internal supply voltage and the second voltage in response to a signal indicating a shut-down or a fault; and a gate drive channel configured to drive the first power switch into conductance by applying the voltage difference between the internal supply voltage and the second voltage between a control terminal and a main terminal of the power switch, gate drive channel configured to continue the driving of the first power switch for a time duration after the signal indicating the shut-down or the fault.

15 Claims, 4 Drawing Sheets

(51) Int. Cl.
*B60L 15/00* (2006.01)
*B60L 50/51* (2019.01)
*G05F 3/18* (2006.01)

(52) U.S. Cl.
CPC .............. *B60L 50/51* (2019.02); *G05F 3/18* (2013.01); *B60L 2210/40* (2013.01); *B60L 2240/527* (2013.01)

(58) Field of Classification Search
CPC .......... B60L 2210/40; B60L 2240/527; B60L 3/0023; G05F 3/18; H02M 1/08; H02M 1/322; H02M 1/0006; H02M 7/5387; H02M 7/53871; H02M 1/088; H02M 1/32; H02M 1/36; H02P 27/085
USPC ............... 318/801, 800, 799, 798, 767, 727
See application file for complete search history.

(56) References Cited

U.S. PATENT DOCUMENTS

| | | | |
|---|---|---|---|
| 7,635,998 B1 | 12/2009 | Taki | |
| 8,022,569 B2 * | 9/2011 | Chen | B60L 3/0046 307/115 |
| 8,039,993 B2 | 10/2011 | Kaplan | |
| 8,115,457 B2 | 2/2012 | Balakrishnan et al. | |
| 8,140,204 B2 * | 3/2012 | Okubo | B60W 10/26 903/930 |
| 8,299,730 B2 | 8/2012 | Gaknoki et al. | |
| 8,432,648 B2 | 4/2013 | Fukuyama et al. | |
| 8,610,382 B2 | 12/2013 | Goldammer et al. | |
| 9,018,865 B2 * | 4/2015 | Meyer, III | H01M 10/44 320/135 |
| 9,041,329 B2 * | 5/2015 | Zhang | B60L 3/0069 318/400.34 |
| 9,043,066 B2 | 5/2015 | Kanzaki et al. | |
| 9,219,420 B1 | 12/2015 | Zhang et al. | |
| 9,548,675 B2 | 1/2017 | Schoenknecht | |
| 9,748,947 B1 | 8/2017 | Wagoner et al. | |
| 9,954,461 B1 | 4/2018 | Duvnjak | |
| 10,183,555 B2 | 1/2019 | Sakai et al. | |
| 10,384,561 B2 | 8/2019 | Yang et al. | |
| 10,644,581 B2 | 5/2020 | El Markhi et al. | |
| 10,998,843 B2 | 5/2021 | Baeurle | |
| 11,437,911 B2 | 9/2022 | Duvnjak | |
| 12,081,139 B2 | 9/2024 | Jungkunz et al. | |
| 2006/0202636 A1 | 9/2006 | Schneider | |
| 2007/0182361 A1 | 8/2007 | Pande et al. | |
| 2010/0102638 A1 | 4/2010 | Chen et al. | |
| 2011/0080149 A1 | 4/2011 | Fukuta et al. | |
| 2013/0223104 A1 | 8/2013 | Tian et al. | |
| 2014/0247000 A1 | 9/2014 | Schoenknecht | |
| 2016/0134187 A1 | 5/2016 | Pregitzer et al. | |
| 2017/0170715 A1 | 6/2017 | Sathik et al. | |
| 2017/0256971 A1 | 9/2017 | Namou et al. | |
| 2017/0257092 A1 | 9/2017 | Rossi et al. | |
| 2017/0305274 A1 | 10/2017 | Saha et al. | |
| 2018/0079315 A1 | 3/2018 | Yang et al. | |
| 2018/0219546 A1 | 8/2018 | Yang et al. | |
| 2019/0295776 A1 | 9/2019 | Schiedermeier | |
| 2020/0067400 A1 | 2/2020 | Li et al. | |
| 2020/0339103 A1 | 10/2020 | Takahashi | |
| 2020/0395837 A1 | 12/2020 | Jeong et al. | |
| 2022/0097632 A1 | 3/2022 | D'Angelo et al. | |
| 2022/0258610 A1 | 8/2022 | Volke et al. | |
| 2023/0318444 A1 | 10/2023 | Dick et al. | |
| 2024/0088812 A1 | 3/2024 | El-Barbari et al. | |
| 2024/0278648 A1 | 8/2024 | David et al. | |
| 2024/0305185 A1 | 9/2024 | D'Angelo et al. | |

FOREIGN PATENT DOCUMENTS

| | | |
|---|---|---|
| JP | 2008061300 A | 3/2008 |
| JP | 2009232620 A | 10/2009 |
| WO | 2014159456 A1 | 10/2014 |

OTHER PUBLICATIONS

European Patent Application No. 21157846.3; "European Search Report"; Oct. 14, 2021, 13 pages.

European Patent Application No. 21157852.1; "European Search Report"; Jul. 23, 2021, 11 pages.

Ke, Ziewei et al., "DC Bus Capacitor Discharge of Permanent Magnet Synchronous Machine Drive Systems for Hybrid Machine Drive Systems for Hybrid Electric Vehicles", IEEE 978-1-4673-9550-2/16, 2016, 6 pages.

European Application Serial No. 21157852.1; "Communication pursuant to Article 94(3) EPC"; Mailed Mar. 20, 2024; 7 pages.

European Application Serial No. 22157367.8; "Communication pursuant to Article 94(3) EPC"; Mailed Mar. 14, 2024; 7 pages.

U.S. Appl. No. 17/665,249; "Non-Final Rejection mailed Nov. 13, 2024"; 12 pages.

* cited by examiner

ACTIVE DISCHARGE OF AN ELECTRIC DRIVE SYSTEM

CROSS-REFERENCE TO RELATED APPLICATIONS

This application claims priority to European Patent Application No. 21157846.3, filed on Feb. 18, 2021. European Patent Application No. 21157846.3 is hereby incorporated by reference in their entirety.

TECHNICAL FIELD

This invention relates to the active discharge of an electric drive system.

BACKGROUND

Electric drive systems are found in electric vehicles such as, e.g., electric cars and trucks, hybrid electric cars and trucks, and electric trains and trams. Electric vehicles generally include an inverter that converts a battery or other dc output into an ac signal for driving an electric motor. In these vehicles, a relatively large and high current capacity energy storage capacitance is commonly used as an intermediate buffer between the battery and the inverter. These capacitances can be referred to as "DC link capacitors" or "smoothing capacitors." These capacitances smoothen the input voltage, provide low-inductive current paths to the inverter output stage, and to store energy.

An electric drive system in a battery-powered electric vehicle will typically be shut down several thousand times over its operational lifespan. During a shutdown, the battery is isolated from the rest of the electric drive system. However, without further measures, the intermediate DC link capacitor will retain a charge after being disconnected from the battery. For safety reasons, regulatory agencies often require that this charge be dissipated reasonably soon after shut down. For example, a typical regulatory requirement would have the DC link capacitor discharged within 2 seconds to a voltage below 60 volts.

In some cases, a discharge switch and a resistor can be coupled across the DC link capacitor. After disconnection from the battery, this discharge switch is switched into conduction and the DC link capacitor is discharged through the resistor.

DESCRIPTION OF DRAWINGS

Non-limiting and non-exhaustive embodiments of the present invention are described with reference to the following figures, wherein like reference numerals refer to like parts throughout the various views unless otherwise specified.

Like reference symbols in the various drawings indicate like elements. The details of one or more implementations are set forth in the accompanying drawings and the description below. Other features, objects, and advantages will be apparent from the description and drawings, and from the claims.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As discussed above, regulatory agencies often require that the charge retained on a DC link capacitor after disconnection be dissipated reasonably soon after shut down.

In embodiments of the present disclosure, one or more of the power switches that drive the electric motor can be used to discharge the DC link capacitor. The amount of current conducted by the power switch is responsive to the difference between a control terminal voltage and a reference terminal voltage of the power switch. A gate drive unit controls the voltage difference between a control terminal and a reference terminal to turn ON and OFF the power switch and discharge the DC link capacitor. In embodiments, the difference between the control terminal voltage and the reference terminal voltage may be varied to control current conduction by the power switch during discharge the DC link capacitor.

Figure 1:
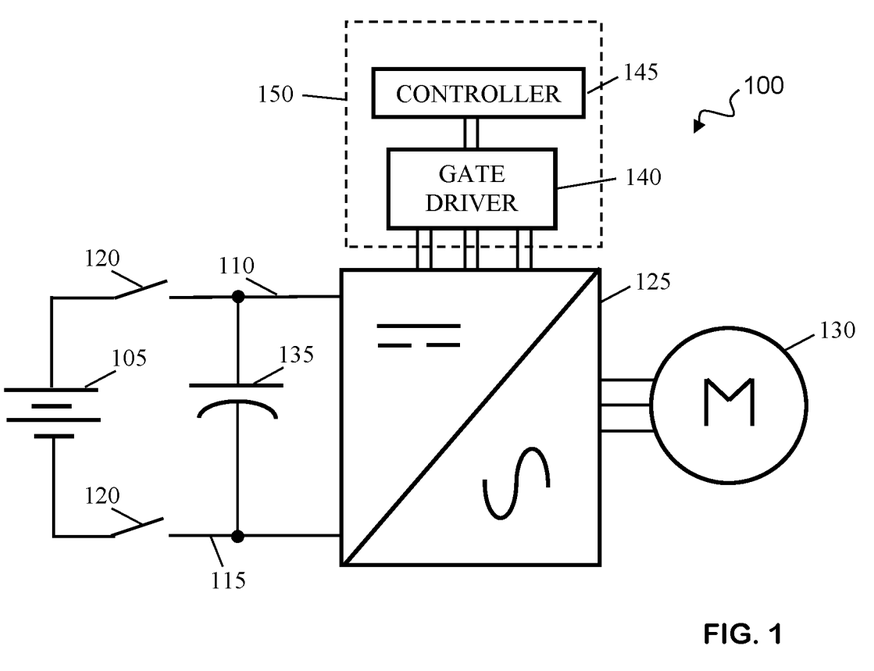
FIG. 1 is a schematic representation of an electric drive system.

FIG. 1 is a schematic representation of an electric drive system 100. Drive system 100 includes a battery 105 reversibly coupled between a high rail 110 and a low rail 115 by a switch 120. Drive system 100 also includes an inverter 125, an electric motor 130, and a gate drive channel 150. In operation, under the direction of gate drive channel 150, inverter 125 converts the dc voltage supplied by battery 105 into an ac voltage and supplies electric motor 130 with power. A DC link capacitor 135 is coupled between rails 110, 115. When battery 105 is decoupled from rails 110, 115 by switch 120, DC link capacitor 135 is discharged though inverter 125.

In more detail, switches 120 are typical mechanical switches and coupled to connect and disconnect battery 105 from rails 110, 115. Under normal conditions, battery 105 will be connected to rails 110, 115 when the vehicle that includes drive system 100 is in operation, e.g., moving or ready to move. Battery 105 will be disconnected from rails 110, 115 during shut-off or in the event of a sufficiently severe fault condition.

Upon connection of battery 105 to rails 110, 115, both DC link capacitor 135 and inverter 125 will be biased by battery 105. The voltage developed across DC link capacitor 135 will tend towards equality with the voltage provided by battery 105. However, deviations from equality will occur since DC link capacitor 135 accepts and provides charge more quickly than battery 105. In addition, the DC link capacitor 135 is generally placed physically closer to the power switches of inverter 125 and some distance from the battery 105. The cable inductance could lead to high transient voltage events. DC link capacitor 135 thus acts to smooth the voltage between rails 110, 115 across inverter 125.

Inverter 125 can include a collection of phase legs that are each formed by a pair of switching devices coupled in series between rails 110, 115. In general, the switching devices will be insulated-gate bipolar transistors (IGBT) or other power semiconductor devices. Other power semiconductor switches could include gallium nitride (GaN), silicon (Si), or silicon carbide (SiC) based transistors. Further, metal-oxide field-effect transistors (MOSFET) or bipolar junction transistors (BJT) may also be used. The switching of the switching devices is driven by gate driver circuitry 140 under the control of a controller 145. Gate driver circuitry 140 is configured to appropriately bias the switching devices in inverter 125 in accordance with control signals received from controller 145. Controller 145 is configured to generate the control signals in response to higher level control signals. Example of higher level control signals include, e.g., an indication that the vehicle's velocity is to be increased or decreased. Like inverter 125, gate driver circuitry 140 is referenced to rail 115. Controller 145 can also be referenced to rail 115, can be referenced to another voltage, or can include some components that are referenced to rail 115 and other components that are referenced to another voltage.

In any case, gate driver circuitry 140 and controller 145 can be considered to be part of a gate drive channel 150 that controls the provision of power to electric motor 130 by appropriately driving switches in inverter 125. As discussed further below, controller 145 can also switch one or more of the switching devices in inverter 125 to discharge DC link capacitor 135 when battery 105 is decoupled from rails 110, 115 by switch 120.

Figure 2:
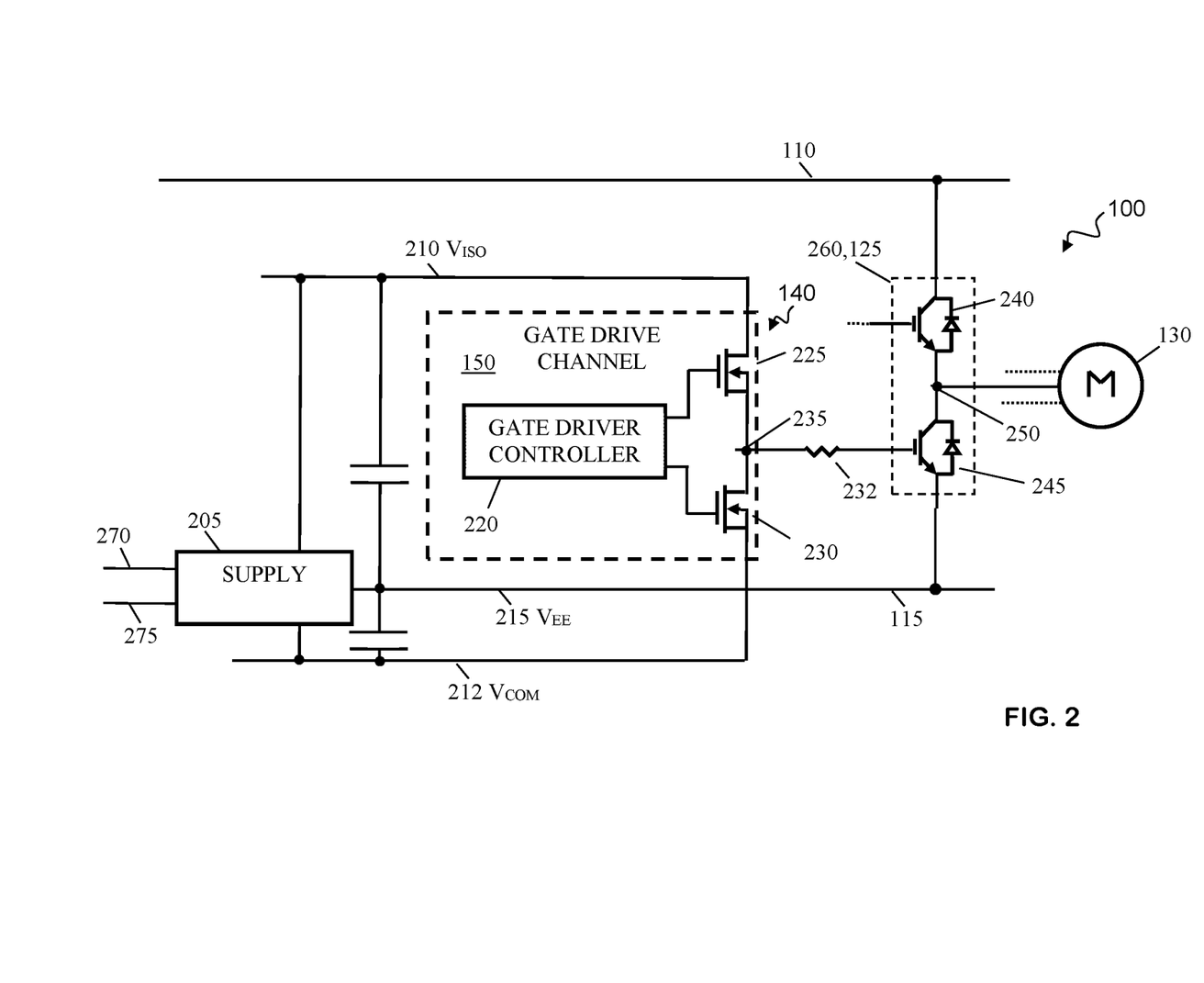
FIG. 2 is a schematic representation of the portion responsible for controlling the provision of power to an electric motor via a single phase leg in the electric drive system of FIG. 1.

FIG. 2 is a schematic representation of a portion of the circuitry in electric drive system 100, namely, a portion responsible for controlling the provision of power to electric motor 130 via a single phase leg.

In more detail, electric drive system 100 includes a supply 205. In general, supply 205 is configured to generate an internal supply voltage (i.e., $V_{ISO}$-$V_{COM}$) between its output rails 210, 212. Supply 205 is coupled to input rails 270, 275 and output rails 210, 212. In some implementations, high rail 110 and low rail 115 are coupled to input rails 270. In other implementations, with reference to DIN 72552, contacts 30/31 are coupled to input rails 270, 275. In one example, DIN 72552 contact 30 can be coupled to input rail 270 and DIN 72552 contact 31 coupled to input rail 275.

In the illustrated low side portion of electric drive system 100, an intermediate output 215 with a voltage $V_{EE}$ that is in a range between $V_{ISO}$ and $V_{COM}$ is tied to low rail 115 of battery 115. As an aside, in a corresponding high side portion of electric drive system 100 to control IGBT 240, the intermediate output of a second supply will be tied to an intermediate node in phase leg 260 of inverter 125, i.e., output node 250.

Returning to the illustrated low side portion of electric drive system 100, in one example with the intermediate output 215 of supply 205 tied to low rail 115, voltage $V_{ISO}$ is in a voltage range suitable to drive power switch 245 and referenced to rail 115. Further, voltage $V_{COM}$ 212 is selected to accommodate the turn-off gate voltage of IGBT 245. In one example, voltage $V_{COM}$ 212 is low with respect to the voltage on rail 115. By virtue of the conversion performed by supply 205, the voltage differences between high supply rail 210, low supply rail 212, and intermediate output 215 can be fairly constant even in the face of changes in load conditions. These load conditions include the speed of the vehicle and can be reflected in the switching frequency of power switch 245 during operation of the vehicle. Further, the magnitude of the voltage differences between $V_{ISO}$, $V_{EE}$, and $V_{COM}$ are selected to provide the turn-on and turn-off voltages for IGBT 245. Further, $V_{ISO}$, $V_{EE}$, and $V_{COM}$ could be utilized to provide working supply voltages to internal circuitry in drive system 100. For example, the voltage difference between $V_{ISO}$ and $V_{EE}$ can be between 10-30 V (e.g., 15 Volts). During vehicular driving, the voltage difference between $V_{EE}$ and $V_{COM}$ can be, e.g., >0-10 volts (e.g., 5 volts) so that the voltage $V_{COM}$ on rail 212 is below the voltage on low rail 115.

As discussed further below, the voltage difference between rail 210, 215 (i.e., $V_{ISO}$-$V_{EE}$) can be changed to discharge DC link capacitor 135 when battery 105 is decoupled from rails 110, 115.

Amongst the circuitry in drive system 100 that $V_{ISO}$ 210 and $V_{COM}$ 212 supply is at least a portion of gate drive channel 150. The illustrated implementation of a portion of gate drive channel 150 includes a gate driver controller 220, a pull up transistor 225, a pull down transistor 230, and a single gate resistor 232. Gate driver controller 220 is configured to receive control signals and controls transistors 225, 230 in accordance with those control signals. Pull up transistor 225 is coupled between high supply rail 210 and an output node 235 of the gate drive channel. Pull down transistor 230 is coupled between output node 235 and low rail 212. Gate resistor 232 conducts drive signals from output node 235 to IGBT 245.

Other implementations of this portion of gate drive channel 150 are possible. For example, rather than including output node 235, the gate of IGBT can be pulled up and down using different channels that each include one transistor and one gate resistor and alternatively couple the gate of the IGBT 245 to a respective rail. Although pull up transistor 225 and pull down transistor 230 are shown as MOSFETs, respectively, it should be appreciated that other transistor devices (e.g., npn and pnp BJTs) may be used.

The illustrated portion of electric drive system 100 also includes a single phase leg 260 of inverter 125. Phase leg 260 includes a pair of IGBTs 240, 245 coupled in series between positive rail 110 and low supply rail 212. An output node 250 of inverter 125 is between IGBTs 240, 245 and reversibly coupled to a single one of either positive rail 110 or low supply rail 115 when a respective of IGBTs 240, 245 is switched into conduction.

Note that the control terminal (i.e., gate) of each IGBT 240, 245 is coupled to a respective portion of gate drive channel 150, although only the coupling of IGBT 245 is shown in the schematic illustration. Further, inverter 125 includes additional phase legs (e.g., 3 or 4 phase legs in toto).

In operation, gate driver controller 220—in conjunction with other portions of gate drive channel 150—will coordinate the switching of IGBTs 240, 245 and other switches in other legs of inverter 125 in order to power motor 130. When IGBT 245 is to be biased into conduction, pull down transistor 230 is driven into a non-conductive state by gate driver controller 220 and pull up transistor 225 is driven into a conductive state. Conduction through pull up transistor 225 biases IGBT 245 positively with respect to low supply rail 215 and into conduction. Current can flow through motor 130 and IGBT 245 to low supply rail 115. When IGBT 245 is to be biased into non-conduction, pull up transistor 225 is driven into a nonconductive state and pull down transistor 230 is driven into a conductive state by gate driver controller 220. Conduction through pull down transistor 230 biases the gate of IGBT 245 negatively with respect to low supply rail 115 and out of conduction. Since supply 205 supplies the voltages $V_{ISO}$, $V_{COM}$, low rail 212 can negatively bias the gate of IGBT 245 and ensure a proper shut-off.

For example, assume that, during vehicular operation, supply 205 supplies a voltage difference of 20 Volts between $V_{ISO}$ or rail 210 and $V_{COM}$ of rail 212, with $V_{EE}$ about 5 volts above $V_{COM}$. The voltage difference between $V_{ISO}$ and $V_{EE}$ is thus approximately 15 Volts. With pull down transistor 230 in conduction and pull up transistor 225 not conducting, the gate of IGBT 245 will be biased to five volts below $V_{EE}$—and hence below the emitter of IGBT 245. Turn-off of IGBT 245 is insured. With pull up transistor 225 in conduction and pull down transistor 230 not conducting, the gate of IGBT 245 will be biased 15 volts positively with respect to $V_{EE}$—and 15 volts above the emitter of IGBT 245. Turn-on of IGBT 245 is insured and IGBT 245 will conduct with a given transconductance.

Figure 3:
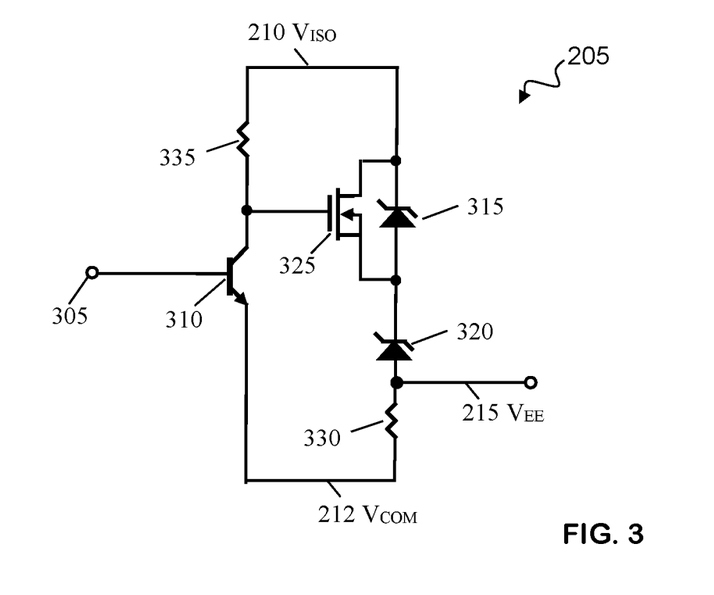
FIG. 3 is a schematic representation of a supply in the electric drive system of FIG. 1.

FIG. 3 is a schematic representation of a portion of the circuitry in supply 205. In particular, FIG. 3 is a schematic representation of a portion of the circuitry in supply 205 which generates voltage $V_{EE}$ 215. The illustrated portion of supply 205 includes an input 305, a control transistor 310, Zener diodes 315, 320, a bypass transistor 325, and a resistance 330. In the context of the remainder of drive system 100, input 305 is coupled to receive a signal indicative of the need to discharge DC link capacitor 135, e.g., upon shut down of the vehicle. Referenced to low rail 212, the signal received at input 305 is sufficient to bias control transistor 310 into conductance when the vehicle is operational. However, the signal received at input 305 is too low or otherwise insufficient to bias control transistor 310 into conductance when the DC link capacitor 135 is to be discharged. It should be appreciated that the supply 205 and the gate driver controller may be formed as part of an integrated circuit that is manufactured as either a hybrid or monolithic integrated circuit. Further, the gate driver controller 220 may be implemented as an integrated circuit and the supply 205 may be implemented external from the gate drive controller 220. Or even, a portion of the supply 205 and the gate driver controller may be formed as part of an integrated circuit while other portions of the supply 205 are external to the gate driver controller. In the illustrated implementation, control transistor 310 is implemented as an NPN transistor that has a collector terminal coupled to high supply rail 210 ($V_{ISO}$) through a resistance 335 and an emitter terminal that is coupled to low rail 212 ($V_{COM}$). When the signal received at input 305 biases control transistor 310 into conductance, the voltage on the collector terminal of control transistor 310 essentially becomes equal to the voltage $V_{COM}$ on low rail 212, i.e., essentially the entire voltage difference between $V_{ISO}$ and voltage $V_{COM}$ on low rail 212 is dropped across resistance 335. The control terminal of bypass transistor 325—here, the gate of an N-channel MOSFET—is thereby biased so that bypass transistor 325 does not conduct. In contrast, when the signal received at input 305 biases control transistor 310 so that it does not conduct, the voltage on the collector terminal of control transistor 310 essentially becomes equal to the voltage $V_{ISO}$, i.e., essentially the entire voltage difference between high supply rail 210 and low rail 212 is across control transistor 310. The control terminal of bypass transistor 325 is thereby biased so that bypass transistor 325 conducts and Zener diode 315 is bypassed. The illustrated implementation that includes transistor 310 and resistance 335 can be used even if the amplitude of the input 305 is not large enough to turn-on transistor 325. However, in implementations where the amplitude of input 305 is large enough to turn-on transistor 325, transistor 310 and resistance 335 may be omitted.

Zener diode 315 and bypass transistor 325 are coupled in series with Zener diodes 320 and resistance 330 to form a voltage divider between high supply rail 210 and low rail 115. The breakdown voltages of Zener diodes 315, 320 and the value of resistance 330 can be selected to ensure that:
1) when Zener diode 315 is not bypassed (e.g., during operation of the vehicle), the voltage $V_{EE}$ on intermediate output 215 is sufficiently low that application of the voltage $V_{ISO}$ on high supply rail 210 to output node 235 and the control terminal of IGBT 245 suffices to drive IGBT 245 with a high transconductance, and
2) when Zener diode 315 is bypassed (e.g., during discharge of DC link capacitor 135), the voltage difference between high supply rail and intermediate output 215 (i.e., $V_{ISO}$ 210-$V_{EE}$) only suffices to bias IGBT 245 into conduction with a limited transconductance when the voltage on voltage $V_{ISO}$ on high supply rail 210 is applied to output node 235 and to the control terminal of IGBT 245.

In other words, the breakdown voltages of Zener diodes 315, 320 and the value of resistance 330 can be selected to ensure that the voltage difference $V_{ISO}$-$V_{EE}$ between high supply rail 210 and intermediate output 215 either drives IGBT 245 to conduct with a very low impedance (approximately a short circuit) or with an impedance that is sufficiently high to resist current flow.

Again referring to example voltage values, supply 205 can maintain voltage difference of 20 Volts between $V_{ISO}$ and the voltage $V_{COM}$ on low rail 212 with $V_{EE}$ about 5 volts above the voltage $V_{COM}$ on low rail 212. Under these circumstances, Zener diodes 315, 320 can each be chosen to provide a breakdown voltage of ~7.5 V. During vehicular operation with bypass transistor 325 not conducting, this provides a turn on voltage (i.e., the voltage difference between $V_{ISO}$ and $V_{EE}$) of 15 volts and a turn off voltage (i.e., the voltage difference between $V_{EE}$ and $V_{COM}$) of negative five volts.

In contrast, when DC link capacitor 135 is to be discharged, bypass transistor 325 bypasses Zener diode 315. This provides a turn on voltage (i.e., the voltage difference between $V_{ISO}$ and $V_{EE}$) of 7.5 volts and a turn off voltage (i.e., the voltage difference between $V_{EE}$ and $V_{ISO}$) of approximately negative 12.5 volts. As an aside, these calculations are for idealized components. A more realistic simulation could consider that a larger voltage is dropped across the series of bypass transistor 325 and Zener diode 320 (e.g., resulting in a turn-on voltage of approximately nine volts and a turn off voltage of approximately negative 11 volts).

In operation, the transition to begin discharge of DC link capacitor 135 can be initiated in response to, e.g., the same signal that opens switch 120. Gate driver channel 150 can stop driving the switches in inverter 125. Then, in one implementation, the high-side switch in each respective phase leg (e.g., IGBT 240 in phase leg 260) can be turned on and driven to conduct with a high transconductance. Also, bypass transistor 325 can be switched into conductance, resulting in a voltage difference between high supply rail 210 and intermediate output 215 (i.e., $V_{ISO}$-$V_{EE}$) that suffices to drive IGBT 245 with a limited transconductance. The time required for the change depends on, e.g., the capacitances between high supply rail 210, intermediate output 215, and low rail 212 (e.g., shown in FIG. 2), as well as the characteristics of other components in electric drive system 100. For example, referring again to FIG. 3, supply 205 can further include a voltage buffer (e.g., a unity gain operational amplifier voltage follower) between the anode of Zener diode 320 and intermediate output 215. If such an operational amplifier can source/sink relatively large currents, then the voltage on intermediate output 215 can follow the voltage on the anode of Zener diode 320 more quickly. In real-world applications, a suitable transition time would be approximately 5% to 20% of requested discharge time (e.g. 100 ms to 400 ms for a discharge time of 2 s).

After the voltage difference between high supply rail 210 and intermediate output 215 (i.e., $V_{ISO}$-$V_{EE}$) has settled to an appropriate value, the gate driver controller can be controlled to pulse the control terminal of IGBT 245 with a series of pulses that each only suffice to bias IGBT 245 into conduction with a limited transconductance. In some implementations, the pulses can be width modulated to as to discharge DC link capacitor 135 with a desired waveform. For example, in some implementations, it may be desirable to modulate the pulses to discharge DC link capacitor 135 so that the charge across DC link capacitor 135 drops relatively quickly when discharge begins but the rate of discharge decreases over time. For example, the discharge can occur exponentially over time. In response to the voltage across DC link capacitor 135 dropping below a predefined level (e.g., 60 V or other level specified by an appropriate regulatory agency), the active discharge of DC link capacitor 135 can be stopped. For example, both the pulsing of the low-side switches in the different phase legs and the driving of the high-side switches in the different phase legs can be stopped. Further, bypass transistor 325 need not be biased to conduct.

In other active discharge implementations, rather than driving the high-side switches in each respective phase leg to conduct with a relatively high transconductance and pulsing the low-side switches with a relatively low transconductance, the low-side switches can be driven to conduct with a high transconductance and the high-side switches can be pulsed. In still other implementations, both the high-side and low-side switches can be pulsed—either in synch or asynchronously. In still other implementations, only a proper subset of the phase legs need participate in active discharge of DC link capacitor 135. In all of these cases, an appropriate voltage for pulsing the respective switches can be achieved by tailoring the voltages provided by a supply.

Figure 4:
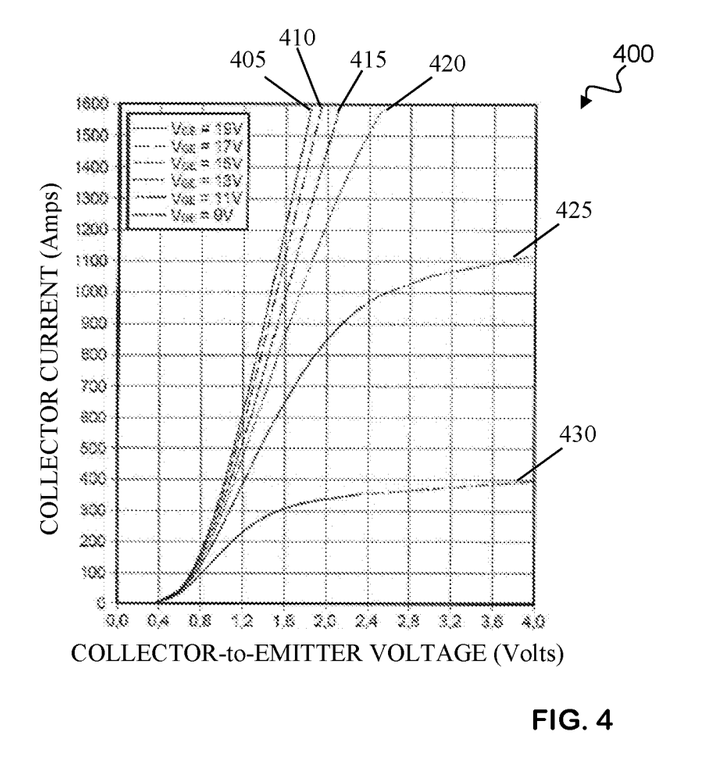
FIG. 4 is a graph that represents the output characteristics of an IGBT that is suitable for use an inverter in an electric vehicle drive system.

FIG. 4 is a graph 400 that represents the output characteristics of an IGBT that is suitable for use an inverter in an electric vehicle drive system, e.g., as IGBT's 240, 245.

Position along the x-axis in graph 400 denotes the voltage difference between the collector and the emitter (i.e., $V_{CE}$) of the IGBT in volts. Position along the y-axis denotes the collector current (i.e., $I_C$) in amperes. The different curves 405, 410, 415, 420, 425, 430 are each associated with a different voltage between the gate and the emitter of the IGBT (i.e., $V_{GE}$). For example, curve 405 shows the relationship between $V_{CE}$ and $I_C$ when $V_{GE}$ is 19 Volts, curve 410 shows the relationship between $V_{CE}$ and $I_C$ when $V_{GE}$ is 17 Volts, curve 415 shows the relationship between $V_{CE}$ and $I_C$ when $V_{GE}$ is 15 Volts, curve 420 shows the relationship between $V_{CE}$ and $I_C$ when $V_{GE}$ is 13 Volts, curve 425 shows the relationship between $V_{CE}$ and $I_C$ when $V_{GE}$ is 11 Volts, and curve 430 shows the relationship between $V_{CE}$ and $I_C$ when $V_{GE}$ is 9 Volts. As shown, as $V_{GE}$ decreases, the slope of curves 405, 410, 415, 420, 425, 430 decreases and the resistance of the IGBT increases.

In general, graphs like graph 400 are provided by the supplier of an IGBT can be readily used to tailor the voltages and the values of different components to a particular set of operational circumstances.

Figure 5:
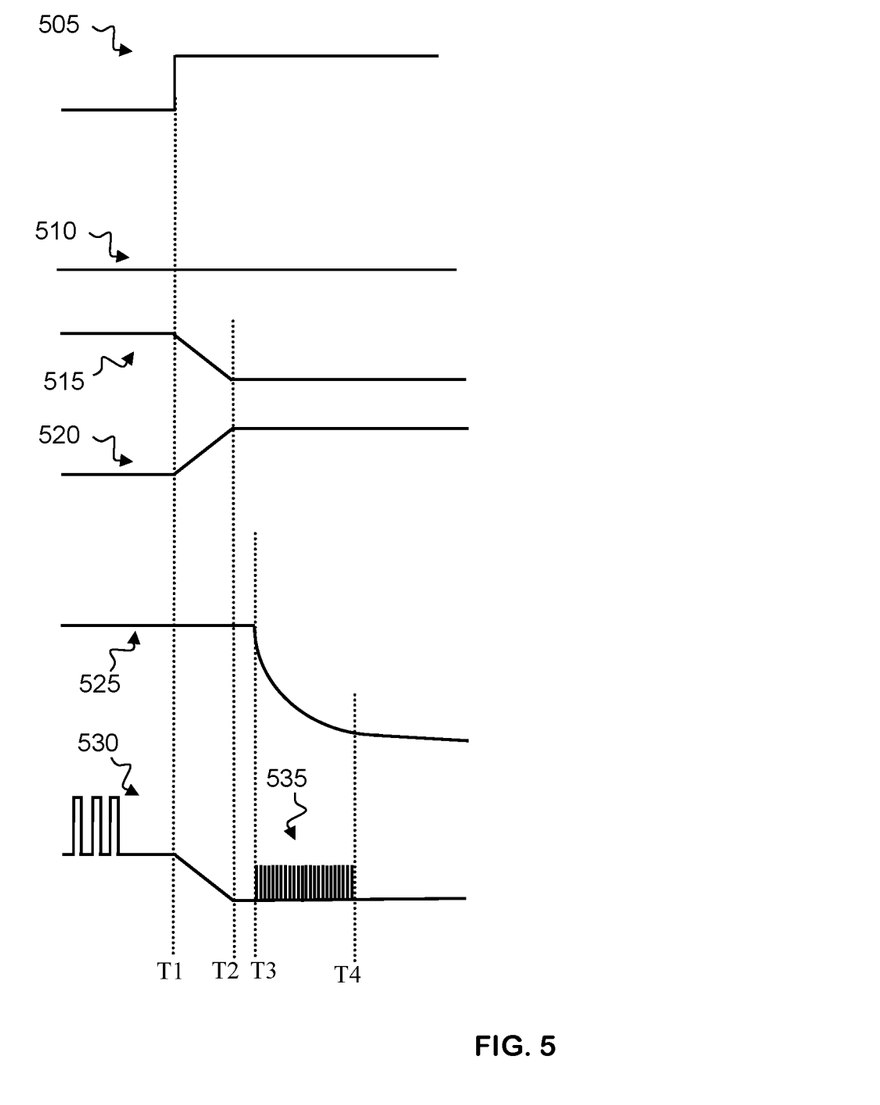
FIG. 5 is a schematic representation of different waveforms in the electric drive system of FIG. 1.

FIG. 5 is a schematic representation of different waveforms in an electric drive system 100. The waveforms are all presented as a function of time and span a window during which the voltage across DC link capacitor 135 is discharged. For example, the waveforms can span a short window during and shortly after shut down or a response to a sufficiently severe fault condition.

Waveform 505 represents the voltage applied to the gate of bypass transistor 325. Waveform 510 represents the regulated voltage $V_{ISO}$ at high supply rail 210 relative to the voltage $V_{COM}$ on low rail 212. Waveform 515 represents the voltage difference between the voltage $V_{ISO}$ at high supply rail 210 and the voltage $V_{EE}$ at intermediate output 215. Waveform 520 represents the voltage difference between the voltage $V_{EE}$ at intermediate output 215 and the voltage $V_{COM}$ at low rail 212. Waveform 525 represents the voltage across DC link capacitor 135. Waveform 530 represents the gate-to-emitter voltage of IGBT 245 (or other IGBT that participates in active discharge of DC link capacitor 135).

Prior to time T1, the voltage applied to the gate of bypass transistor 325, i.e., waveform 505 is low and bypass transistor 325 remains in a non-conductive state. The voltage $V_{ISO}$-$V_{COM}$, i.e., waveform 510 is regulated to a constant value—as it is throughout the illustrated time window. The voltage difference between the voltage at high supply rail 210 and the voltage at intermediate output 215, i.e., $V_{ISO}$-$V_{EE}$ as represented by waveform 515, is relatively high. The voltage difference between the voltage $V_{EE}$ at intermediate output 215 and the voltage at low rail 212, i.e., $V_{EE}$-$V_{COM}$ as represented by waveform 520, is relatively low. As a result, the voltage $V_{EE}$ on intermediate output 215 is sufficiently lower that the voltage $V_{ISO}$ on high supply rail 210 such that application of the voltage $V_{ISO}$ on high supply rail 210 to output node 235 and the control terminal of IGBT 245 suffices to drive IGBT 245 with a high transconductance. Further, the voltage across DC link capacitor 135, i.e., waveform 525 is high and approximately equal to the dc voltage provided by battery 105. The gate-to-emitter voltage of the IGBT, i.e., waveform 530 includes a collection of relatively large amplitude pulses that represent the driving of motor 130.

However, at time T1, discharge of DC link capacitor 135 is triggered, e.g., by vehicle shut down or a sufficiently severe fault condition. The voltage applied to the gate of bypass transistor 325, i.e., waveform 505 rises and bypass transistor 325 is biased into a conductive state. The voltage difference between the voltage $V_{ISO}$ at high supply rail 210 and the voltage $V_{EE}$ at intermediate output 215, i.e., waveform 515, begins to fall and eventually settles at a time T2. Correspondingly, the voltage difference between the voltage $V_{EE}$ at intermediate output 215 and the voltage at low rail 212, i.e., waveform 520, begins to rise and eventually settles at a time T2. Since the voltage difference between $V_{ISO}$ and $V_{COM}$ remains constant, the decrease in waveform 515 is matched by the increase in waveform 520. After waveforms 515, 520 settle, the voltage difference between high supply rail 210 and intermediate output 215 (i.e., $V_{ISO}$-$V_{EE}$) only suffices to bias IGBT 245 into conduction with a limited transconductance when the voltage $V_{ISO}$ on high supply rail 210 is applied to output node 235 and to the control terminal of IGBT 245.

During this settling (i.e., between T1 and T2), the voltage across DC link capacitor 135, i.e., waveform 525, remains high but may decrease slightly, e.g., due to parasitic or other power consumption by various components. However, the gate-to-emitter voltage of the IGBT, i.e., waveform 530, falls in conjunction with the increase in the voltage $V_{EE}$ at intermediate output 215.

At some time T3 after settling, the gate-to-emitter voltage of the IGBT, i.e., waveform 530, is pulsed with a series of pulses 535 that each only suffice to bias IGBT 245 into conduction with a limited transconductance. The voltage across DC link capacitor 135, i.e., waveform 525, discharges while the other waveforms remain unchanged. Subsequently, at time T4, the voltage across DC link capacitor 135 has fallen to a sufficiently low level that active discharge using pulses 535 can be ended. In some implementations, the voltage across DC link capacitor 135 can continue to fall over time due to power consumption by other components.

As discussed above, waveforms 505, 510, 515, 520, 525, 530 only span a short window during and shortly after shut down or a response to a sufficiently severe fault condition. A complete shut down or response can include, e.g., ending the application of a voltage to the gate of bypass transistor 325, ending regulation of the voltage difference $V_{ISO}$-$V_{COM}$, and completion of the discharge of the voltage across DC link capacitor 135. For the sake of brevity, a complete shut down or response is not shown.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

Although the present invention is defined in the claims, it should be understood that the present invention can alternatively be defined in accordance with the following examples.

Example 1. An electric drive system for a vehicle, the electric drive system comprising: an inverter having at least one phase leg, wherein a first of the phase legs includes a first power switch; an internal voltage supply configured to generate a) an internal supply voltage regulated with respect to a voltage on a rail configured to be coupled to a dc power supply, and b) a second voltage, wherein the internal voltage supply is configured to reduce a voltage difference between the internal supply voltage and the second voltage in response to a signal indicating a shut-down or a fault of the vehicle; and a gate drive channel configured to drive the first power switch into conductance by applying the voltage difference between the internal supply voltage and the second voltage between a control terminal and a main terminal of the power switch, gate drive channel configured to continue the driving of the first power switch for a time window after the signal indicating the shut-down or the fault of the vehicle.

Example 2. The electric drive system of example 1, wherein the gate drive channel is configured to pulse the first power switch during the time window.

Example 3. The electric drive system of example 2, wherein the time window is defined with respect to a time needed to discharge a capacitance coupled across the first of the phase legs of the inverter.

Example 4. The electric drive system of any one of examples 1 to 3, wherein the gate drive channel is configured to drive the first power switch out of conductance by applying a voltage outside of a range between the internal supply voltage and the second voltage to the control terminal of the power switch.

Example 5. The electric drive system of any one of examples 1 to 4, wherein the internal voltage supply comprises a voltage divider configured to generate the second voltage by dividing a difference between the internal supply voltage and the voltage on the rail with respect to which the internal supply voltage is regulated.

Example 6. The electric drive system of example 5, wherein the internal voltage supply is configured to reduce the voltage difference between the internal supply voltage and the second voltage by bypassing a portion of the voltage divider.

Example 7. The electric drive system of example 6, wherein the voltage divider comprises a Zener diode and the internal voltage supply is configured to reduce the voltage difference between the internal supply voltage and the second voltage by bypassing the Zener diode.

Example 8. The electric drive system of any one of examples 1 to 7, wherein: the first of the phase legs comprises a second power switch; and the gate drive channel is further configured to drive the second power switch for the time window.

Example 9. The electric drive system of example 8, wherein the gate drive channel is configured to drive the second power switch with a higher transconductance than a transconductance of the first power for the time window.

Example 10. A vehicle comprising the electric drive system of any one of examples 1 to 9.

Example 11. A control system configured to control a power switch that comprises a first terminal, a second terminal, and a control terminal, wherein conductance between the first and second terminals of the power switch is responsive to a difference between a voltage on the control terminal and a voltage on the second terminal, wherein the control system comprises: a supply capacitor coupled between a positive rail and a negative rail of the control system; a system controller configured to detect a discharge command in the control system to discharge the supply capacitor, the system controller configured to output an adjust signal in response to the discharge command; a switch controller coupled to the system controller and configured to receive the adjust signal, wherein the switch controller is configured to control the difference between the voltage on the control terminal and the voltage on the second terminal to vary the conductance between the first and second terminals of the power switch, and wherein the switch controller is further configured to vary the voltage on the second terminal of the power switch in response to the adjust signal, the varying of the voltage configured to decrease an achievable conductance between the first and second terminals of the power switch in response to the adjust signal.

Example 12. The control system of example 11, wherein the switch controller comprises an internal voltage supply configured to generate an internal supply voltage, wherein the internal voltage supply is configured to receive the adjust signal and decrease the achievable conductance between the first and second terminals of the power switch.

Example 13. The control system of example 12, wherein the adjust signal is coupled to a control transistor in the internal voltage supply, wherein the control transistor is coupled to control a magnitude of the voltage on the second terminal of the power switch relative to an internal supply voltage regulated with respect to the positive rail or the negative rail.

Example 14. The control system of example 13, wherein: the internal voltage supply comprises a voltage divider configured to set the voltage on the second terminal of the power switch relative to the internal supply voltage; and the control transistor is configured to control bypassing of a portion of the voltage divider to vary the voltage on the second terminal of the power switch.

Example 15. The control system of any one of examples 11 to 14, wherein the discharge command is a shut-down command.

Example 16. A vehicle comprising the control system of any of examples 11 to 15.

What is claimed is:

1. An electric drive system for a vehicle, the electric drive system comprising:
an inverter having at least one phase leg, wherein a first of the at least one phase leg includes a first power switch;
an internal voltage supply configured to generate
 a) an internal supply voltage regulated with respect to a voltage on a rail coupled to a dc power supply, and
 b) a second voltage,
wherein the internal voltage supply is configured to reduce a voltage difference between the internal supply voltage and the second voltage in response to a signal indicating a shut-down or a fault of the vehicle,
 wherein the internal voltage supply comprises a voltage divider configured to generate the second voltage by dividing a difference between the internal supply voltage and the voltage on the rail with respect to which the internal supply voltage is regulated; and
 a gate drive channel configured to drive the first power switch into conductance by applying the voltage difference between the internal supply voltage and the second voltage between a control terminal and a main terminal of the power switch, the gate drive channel further configured to continue the driving of the first power switch for a time duration after the signal indicating the shut-down or the fault of the vehicle.

2. The electric drive system of claim 1, wherein the gate drive channel is configured to pulse the first power switch during the time duration.

3. The electric drive system of claim 2, wherein the time duration is defined with respect to a time needed to discharge a capacitance coupled across the first of the at least one phase leg of the inverter.

4. The electric drive system of claim 1, wherein the gate drive channel is configured to drive the first power switch out of conductance by applying a voltage outside of a range between the internal supply voltage and the second voltage to the control terminal of the power switch.

5. The electric drive system of claim 1, wherein the internal voltage supply is configured to reduce the voltage difference between the internal supply voltage and the second voltage by bypassing a portion of the voltage divider.

6. The electric drive system of claim 5, wherein the voltage divider comprises a Zener diode and the internal voltage supply is configured to reduce the voltage difference between the internal supply voltage and the second voltage by bypassing the Zener diode.

7. The electric drive system of claim 1, wherein:
the first of the at least one phase leg comprises a second power switch; and
the gate drive channel is further configured to drive the second power switch for the time duration.

8. The electric drive system of claim 7, wherein the gate drive channel is configured to drive the second power switch with a higher transconductance than a transconductance of the first power for the time duration.

9. The electric drive system of claim 1, wherein the electric drive system is housed in a vehicle.

10. A control system configured to control a power switch that comprises a first terminal, a second terminal, and a control terminal, wherein conductance between the first and second terminals of the power switch is responsive to a difference between a voltage on the control terminal and a voltage on the second terminal, wherein the control system comprises:
a supply capacitor coupled between a positive rail and a negative rail of the control system;
a system controller configured to detect a discharge command in the control system to discharge the supply capacitor, the system controller configured to output an adjust signal in response to the discharge command; and
a switch controller coupled to the system controller and configured to receive the adjust signal, wherein the switch controller is configured to control the difference between the voltage on the control terminal and the voltage on the second terminal to vary the conductance between the first and second terminals of the power switch, and wherein the switch controller is further configured to vary the voltage on the second terminal of the power switch in response to the adjust signal, the varying of the voltage configured to decrease an achievable conductance between the first and second terminals of the power switch in response to the adjust signal.

11. The control system of claim 10, wherein the switch controller comprises an internal voltage supply configured to generate an internal supply voltage, wherein the internal voltage supply is configured to receive the adjust signal and decrease the achievable conductance between the first and second terminals of the power switch.

12. The control system of claim 11, wherein the adjust signal is coupled to a control transistor in the internal voltage supply, wherein the control transistor is coupled to control a magnitude of the voltage on the second terminal of the power switch relative to an internal supply voltage regulated with respect to the positive rail or the negative rail.

13. The control system of claim 12, wherein:
   the internal voltage supply comprises a voltage divider configured to set the voltage on the second terminal of the power switch relative to the internal supply voltage; and
   the control transistor is configured to control bypassing of a portion of the voltage divider to vary the voltage on the second terminal of the power switch.

14. The control system of claim 10, wherein the discharge command is a shut-down command.

15. The control system of claim 10, wherein the control system is housed in a vehicle.

\* \* \* \* \*